United States Patent [19]

Bae

[11] Patent Number: 5,790,286

[45] Date of Patent: Aug. 4, 1998

[54] TECHNIQUE FOR EMBODYING DUPLICATION OF OPTICAL PATHS IN OPTICAL DATA TRANSMISSION

[75] Inventor: Tae-Kyung Bae, Daegukwangyeok, Rep. of Korea

[73] Assignee: SamSung Electronics Co., Ltd., Kyungki-do, Rep. of Korea

[21] Appl. No.: 739,067

[22] Filed: Oct. 28, 1996

[30] Foreign Application Priority Data

Oct. 28, 1995 [KR] Rep. of Korea ................ 1995/37903

[51] Int. Cl.[6] ........................................ H04B 10/08
[52] U.S. Cl. ................... 359/110; 359/152; 359/173; 370/221
[58] Field of Search ........................ 359/110, 115, 359/143, 152, 173; 370/221

[56] References Cited

U.S. PATENT DOCUMENTS

| | | | |
|---|---|---|---|
| 5,010,542 | 4/1991 | Pfaff | 370/1 |
| 5,060,302 | 10/1991 | Grimes | 359/135 |
| 5,069,521 | 12/1991 | Hardwick | 359/152 |
| 5,138,475 | 8/1992 | Bergmann et al. | 359/118 |
| 5,241,610 | 8/1993 | Labiche et al. | 385/16 |
| 5,299,293 | 3/1994 | Mestdagh et al. | 359/110 |
| 5,327,275 | 7/1994 | Yamane et al. | 359/110 |
| 5,367,397 | 11/1994 | Tajima | 359/152 |
| 5,432,874 | 7/1995 | Muraguchi | 385/24 |
| 5,469,285 | 11/1995 | Gut | 359/152 |
| 5,521,734 | 5/1996 | Frigo | 359/152 |
| 5,526,157 | 6/1996 | Kawano | 359/141 |
| 5,526,161 | 6/1996 | Suzuki et al. | 359/172 |
| 5,535,031 | 7/1996 | Cecchini | 359/113 |

Primary Examiner—Kinfe-Michael Negash
Attorney, Agent, or Firm—Robert E. Bushnell, Esq.

[57] ABSTRACT

An optical data transmitting technique duplicates optical paths and includes: a divider for dividing electrical data transmitted to an optical data transmitting device of a counterpart device, into first and second output paths; a first optical data transceiver for converting first output path electrical data into optical data and transmitting it to a first receiver of the optical data transmitting device of the counterpart device, outputting first alarm data indicative of an abnormal existence or a nonexistence of the operation upon transmitting the data to the first receiver, receiving and converting optical data transmitted from a first transmitter of the optical data transmitting device of the counterpart device into electrical data, and supplying it to a first input path; a second optical data transceiver for receiving and converting optical data transmitted from a second transmitter of the optical data transmitting device of the counterpart device into electrical data, and supplying to a second input path, converting second output path electrical data into optical data, and transmitting it to a second receiver of the optical data transmitting device of the counterpart device, and outputting second alarm data indicative of an abnormal existence or a nonexistence of the operation upon transmitting the data to the second receiver; and a selector for selecting first input path electrical data in response to the normal state of the first alarm data and selecting second input path electrical data in response to the normal state of the second alarm data.

3 Claims, 2 Drawing Sheets

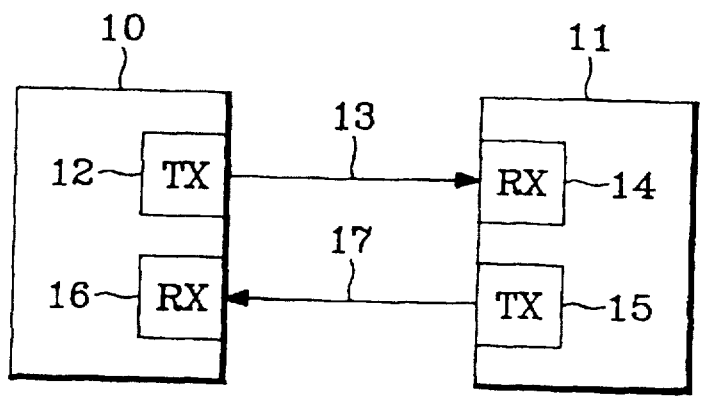
FIG. 1  Conventional Optical Data Transmitting Device
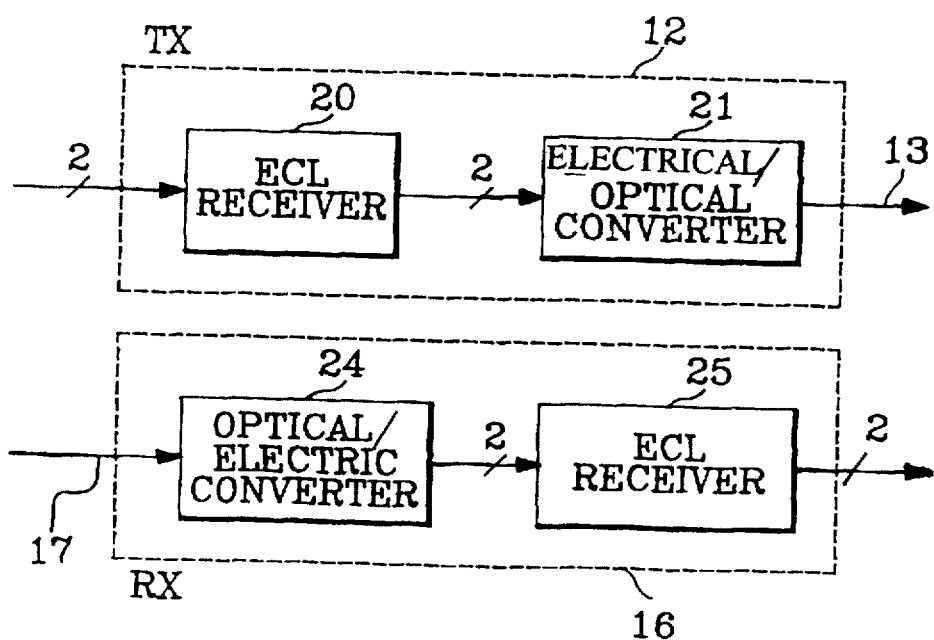
FIG. 2  Conventional Transceiver

TECHNIQUE FOR EMBODYING DUPLICATION OF OPTICAL PATHS IN OPTICAL DATA TRANSMISSION

BACKGROUND OF THE INVENTION

1. Field of the Invention

The present invention relates to an optical data transmitting process and device and, in particular, to a process and device implementing duplication of optical paths in optical data transmission.

2. Description of the Related Art

In earlier optical data transmitting techniques, each of first and second optical transmitting devices transmit data in a single direction. An electro-optical converter disposed within a transmitter of a first optical data transmitting device converts electrical data into optical data and supplies the converted data through an optical cable to an optical-electrical converter disposed within a receiver of the second optical data transmitting device. Reciprocally, data transmission from the second optical data transmitting device to the first optical data transmitting device is performed so as to be opposite to that from the first optical data transmitting device to the second optical data transmitting device. That is, data transmission is performed from the electro-optical converter disposed within a transmitter of the second data transmitting device through an optical cable to the optical-electrical converter disposed within a receiver of the first data transmitting device.

Exemplary efforts representation of contemporary practice with optical data transmission systems include: U.S. Pat. No. 5,010,542 to Pfaff entitled *Multi-Stage Switching Network for Light Waveguides*, U.S. Pat. No. 5,060,302 to Grimes entitled *Automatic Adjustment of Optical Power Output of A Plurality of Optical Transmitters*, U.S. Pat. No. 5,138,475 to Bergmann et al., entitled *DC-Coupled Optical Data Link Utilizing Differential Transmission*, U.S. Pat. No. 5,367,397 to Tajima entitled *Wavelength Stabilizing Method And Its Associated Circuitry For An Optical Communication System*, U.S. Pat. No. 5,241,610 to Labiche et al., entitled *Optical Switching In A Fiber Communication System And Method Using Same*, U.S. Pat. No. 5,432,874 to Muraguchi entitled *Duplex Optical Fiber Link*, U.S. Pat. No. 5,469,285 to Gut entitled *Method And Equipment For Bidirectional Data Transmission (Full-Duplex)*, U.S. Pat. No. 5,521,734 to Frigo entitled *One-Dimensional Optical Data Arrays Implemented Within Optical Networks*, U.S. Pat. No. 5,526,161 to Suzuki et al., entitled *Communication Control Method And Apparatus*, U.S. Pat. No. 5,535,031 to Cecchini entitled *Fiber Optic Interface And System*, and U.S. Pat. No. 5,526,157 to Kawano entitled *Optical Submarine Cable System*.

I have discovered that there is a problem with these circuits because, if a fault occurs in either of the optical/electrical converters or electrical/optical converters, or alternatively, in the optical cables of the first and second optical data transmitting devices, data transmission does not occur over the circuit.

SUMMARY OF THE INVENTION

It is therefore an object of the present invention to provide an improved optical data transmission circuit.

It is another object to provide an optical data transmission circuit able to minimize the risk of an interruption of data transmission via the circuit by transmitting data via paths arranged to avoid faults with a network.

It is still another object to provide an optical data transmitting device for freely transmitting optical data by embodying the duplication of optical paths in the optical data transmission.

These and other objects can be achieved according to the present invention with an optical data transmitting device constructed with a divider dividing electrical data to be transmitted to an optical data transmitting device of a counterpart device, into first and second output paths; a first optical data transmitter and receiver converting the electrical data supplied to the first output path into optical data, transmitting the converted data to a first receiver of the optical data transmitting device of the counterpart device, outputting first alarm data indicative of an abnormal existence or a nonexistence of the operation upon transmitting the data to the first receiver, receiving the optical data transmitted from a first transmitter of the optical data transmitting device of the counterpart device, converting the received data into electrical data, and supplying the converted data to a first input path; a second optical data transmitter and receiver for receiving the optical data transmitted from a second transmitter of the optical data transmitting device of the counterpart device, converting the received data into electrical data, and supplying the converted data to a second input path, converting the electrical data supplied from the second input path into the optical data, transmitting the converted data to a second receiver of the optical data transmitting device of the counterpart device, and outputting second alarm data indicative of an abnormal existence or a nonexistence of the operation upon transmitting the data to the second receiver; and a selector for selecting the electrical data supplied to the first input path in response to the normal state of the first alarm data and selecting the electrical data supplied to the second input path in response to the normal state of the second alarm data.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein:

FIG. 1 is a diagram illustrating the construction of an earlier optical data transmitting device;

FIG. 2 is a detailed block diagram illustrating a transceiver in a first optical data transmitting device shown in FIG. 1.

DETAILED DESCRIPTION OF THE PREFERRED EMBODIMENTS

Figure 3:
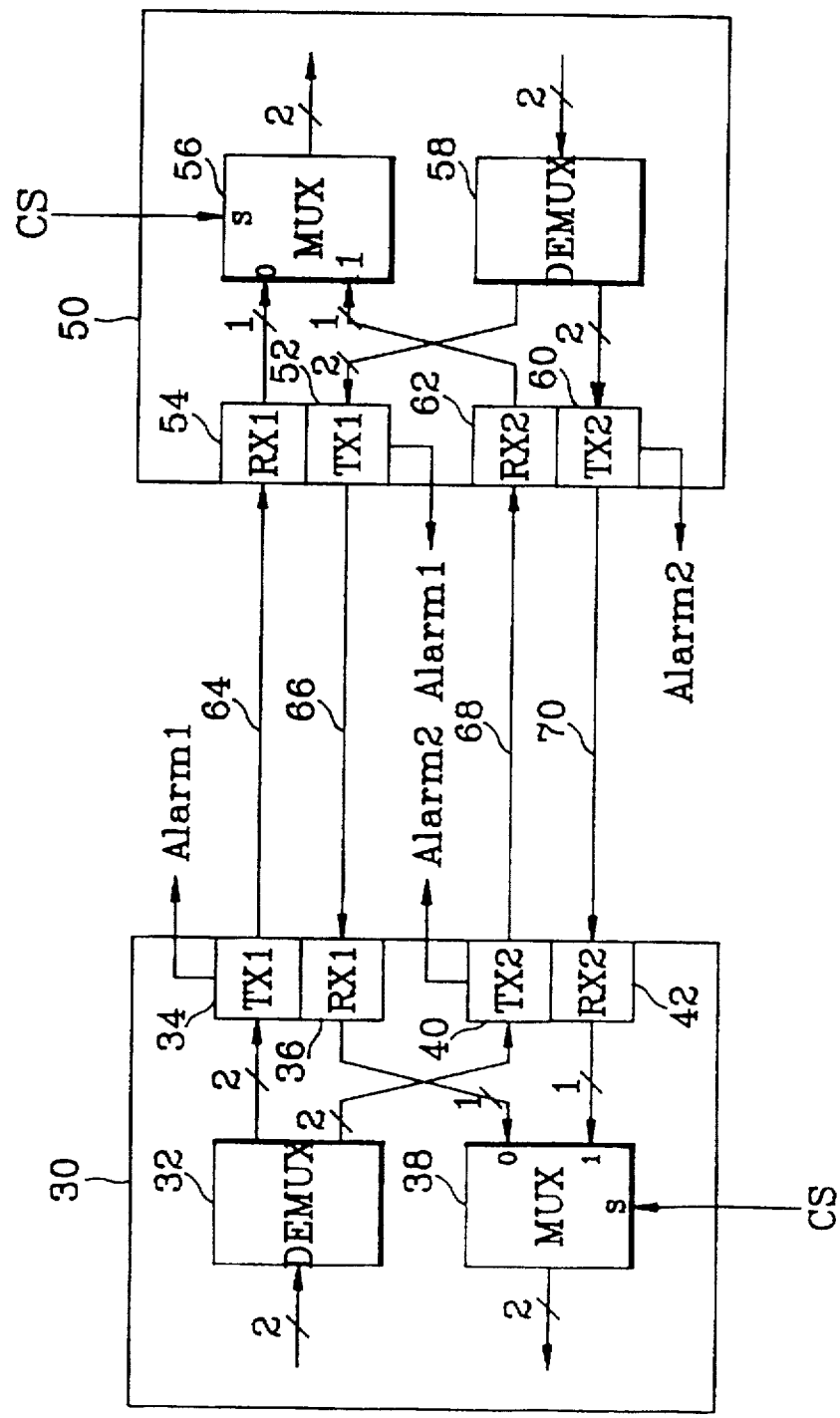
FIG. 3 is a diagram illustrating the construction of an optical data transmitting device constructed according to the principles of the present invention.

Turning now to the drawings, FIG. 1 is a diagram illustrating the construction of an earlier optical data transmitting device. As set forth in FIG. 1, a method for transmitting optical data in the above optical data transmitting device is a point to point connection system. Each of first and second optical data transmitting devices 10 and 11 transmit the data in a single direction.

An electrical/optical converter disposed within a transmitter (TX) 12 of the first optical data transmitting device 10 converts electrical data into optical data and, supplies the converted data through an optical cable 13 to an optical/electrical converter disposed within a receiver (RX) 14 of the second optical data transmitting device 11. Reciprocally, a data transmission from the second optical data transmitting device 11 to the first optical data transmitting device 10 is performed so as to be opposite to that from the first optical data transmitting device 10 to the second optical data transmitting device 11. That is, the data transmission is performed from the electrical/optical converter disposed within a transmitter (TX) 15 of the second data transmitting device 11 through an optical cable 17 to the optical/electric converter disposed within a receiver (RX) 16 of the first data transmitting device 10. FIG. 2 is a detailed block diagram illustrating a transceiver disposed within the first optical data transmitting device 10 shown in FIG. 1. As illustrated in FIG. 2, the first optical data transmitting device 10 is divided into the transmitter 12 and the receiver 16. The transmitter 12 receives data which is converted into a CMI (code mark inversion) code, through an ECL (emitter coupled logic) receiver 20 so as to perform the optical transmission in an interior of the transmitter (TX) 12, converts the received data into optical data via the electrical/optical converter 21, and transmits the converted optical data to the receiver of a counterpart device through the optical cable 13. The receiver 16 receives the optical data transmitted from the transmitter of the counterpart device through the optical cable 17, converts the received data into an electrical signal via the optical/electrical converter 24, and transmits the converted data via the ECL receiver 25 to the interior of the optical data transmitting device.

As stated hereinabove, the earlier optical data transmitting device where two parts to be transmitted are connected to be point to point with each other, uses an electrical/optical converter, an optical/electrical converter, and so on for each of respective components. Such an optical data transmitting device has following problems.

Firstly, there is generated the danger in transmitting the data by reason that the first and second optical data transmitting devices 10 and 11 are connected to be point to point with each other. As mentioned previously, the point to point data transmission is performed from the electrical/optical converter disposed within the transmitter (TX) 12 of the first optical data transmitting device 10 through the optical cable 13 to the optical/electrical converter disposed within the receiver (RX) 14 of the second optical data transmitting device 11 and vice versa. Namely, the point to point data transmission is performed from the electrical/optical converter disposed within the transmitter (TX) 15 of the second optical data transmitting device 11 through the optical cable 17 to the optical/electrical converter disposed within the receiver (RX) 16 of the first optical data transmitting device 10. If a problem exists in one of the optical/electrical converter, the electrical/optical converter, or the optical cables 13 and 17 of the first and second optical data transmitting devices, a data transmission does not occur.

FIG. 3 is a diagram illustrating the construction of an optical data transmitting device constructed according to the principles of the present invention. In FIG. 3, element 30 is a first optical data transmitting device and element 50 is a second optical data transmitting device. The construction and operation of the first optical data transmitting device 30 are same as those of the second optical data transmitting device 50. Four optical cables 64, 66, 68, and 70 are connected between the first optical data transmitting device 30 and the second optical data transmitting device 50. The first optical cable 64 connects a first transmitter (TX1) 34 of the first optical data transmitting device 30 with a first receiver (RX1) 56 of the second optical data transmitting device 50. The second optical cable 66 connects a first receiver (RX1) 36 of the first optical data transmitting device 30 with a first transmitter (TX1) 52 of the second optical data transmitting device 50. The third optical cable 68 connects a second transmitter (TX2) 40 of the first optical data transmitting device 30 with a second receiver (RX2) 62 of the second optical data transmitting device 50. The fourth optical cable 70 connects a second receiver (RX2) 42 of the first optical data transmitting device 30 with a second transmitter (TX2) 60 of the second optical data transmitting device 50.

The first optical data transmitting device 30 is comprised of a demultiplexer (DEMUX) 32, the first transmitter (TX1) 34, the first receiver (RX1) 36, the second transmitter (TX2) 40, the second receiver (RX2) 42, and a multiplexer (MUX) 38. The demultiplexer (DEMUX) 32 divides the electrical data due to be transmitted to the optical data transmitting device of the counterpart device, into first and second output paths. The first transmitter (TX1) 34 converts the electrical data supplied from the first output path into the optical data, transmits the converted data to the first receiver (RX1) 54 of the optical data transmitting device of the counterpart device, and outputs first alarm data Alarm1 indicative of an abnormal existence or a nonexistence of the operation upon transmitting the data to the first receiver (RX1) 54. The first receiver (RX1) 36 receives the optical data transmitted from the first transmitter (TX1) 52 of the optical data transmitting device of the counterpart device, converts the received data into electrical data, and supplies the converted data to a first input path. As well, the second receiver (RX2) 42 receives the optical data transmitted from the second transmitter (TX2) 60 of the optical data transmitting device of the counterpart device, converts the received optical data into the electrical data, and applies the converted data to a second input path. The second transmitter 40 converts the electrical data supplied from the second output path into optical data, transmits the converted optical data to the second receiver (RX2) 62 of the optical data transmitting device of the counterpart device, and outputs second alarm data Alarm2 indicative of an abnormal existence or a nonexistence of the operation upon transmitting the data to the second receiver (RX2) 62. The multiplexer (MUX) 38 selects the electrical data supplied to the first input path in response to the normal state of the first alarm data Alarm1 and selects the electrical data supplied to the second input path in response to the normal state of the second alarm data Alarm2.

Since the second optical data transmitting device 50 has the same construction and operation as that of the first optical data transmitting device 30, a detailed description thereof has been omitted for the sake of brevity. The transmission of the data from the first optical data transmitting device 30 to the second optical data transmitting device 50, the data to be transmitted is divided in the demultiplexer (DEMUX) 32 and is respectively supplied to the first transmitter (TX1) 34 and the second transmitter (TX2) 40. The first transmitter (TX1) 34 and the second transmitter (TX2) 40 convert the electrical data into the optical data, and transmit the converted data through the first optical cable 64 and the third optical cable 68 to the optical data transmitting device 50 of the counterpart device. The first transmitter (TX1) 34 and the second transmitter (TX2) 40 respectively output the first alarm data Alarm1 and the second alarm data Alarm2, the first and second alarm data Alarm1 and Alarm2 being representative of the abnormal existence or a nonexistence of the operation upon transmitting the data. The first and second alarm data Alarm1 and Alarm2 are a high logic level "H" during normal operation and are a low logic level "L" during abnormal operation.

In accordance with the states of the first alarm data Alarm1 and the second alarm data Alarm2, controllers (not shown) of the optical data transmitting devices 30 and 50 apply control signals CS as shown in the following table, to select terminals S of the multiplexers(MUX) 38 and 56.

TABLE

| Alarm 1 | Alarm 2 | CS (Control Signal) |
|---------|---------|---------------------|
| L | L | 0 |
| L | H | 1 |
| H | L | 0 |
| H | H | 0 |

The second optical data transmitting device 50 selects an input terminal 0 upon the control signal CS being set to "0" and selects an input terminal 1 upon the control signal CS being set to "1".

As can be seen in the above table, the control signal CS controls to select the first input path (main path) at all times, when the first transmitter (TX1) 34 and the second transmitter (TX2) 40 are in the normal state, and to select the second input path (secondary path) only when the first transmitter (TX1) 34 is in the abnormal state.

Accordingly, in the event that the first transmitter (TX1) 34 is in the normal state, the data to be transmitted is transmitted from the first transmitter (TX1) 34 through the first optical cable 64 and the first receiver (RX1) 54 through the multiplexer (MUX) 56. However, in the event that the first transmitter (TX1) 34 is in the abnormal state, the data to be transmitted is transmitted from the second transmitter (TX2) 40 through the second optical cable 68 and the second receiver (RX2) 62 to the multiplexer (MUX) 56. Consequently, if problem occurs in the optical/electrical converter and the electrical/optical converter disposed within the transmitters and the receivers of the first and second optical data transmitting devices 30 and 50, the data can be transmitted by being switching into another path. Namely, upon a fault occurring in the above path as described above, the data transmission is performed through another path.

As apparent from the foregoing, the present invention has an advantage in that the data can be freely transmitted by embodying the duplication of paths in the optical data transmission.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. An optical data transmitting device, comprising:

a divider for continuously dividing electrical data to be transmitted to an optical data transmitting device of a counterpart device, into first and second output paths having the same electrical data contained thereon;

a first optical data transceiver for continuously converting said electrical data supplied to said first output path into optical data, continuously transmitting said converted data to a first receiver of said optical data transmitting device of said counterpart device, outputting first alarm data indicative of an abnormal existence or a nonexistence of the operation upon transmitting said data to said first receiver, continuously receiving said optical data transmitted from a first transmitter of said optical data transmitting device of said counterpart device, continuously converting said received data into said electrical data, and continuously supplying said converted data to a first input path;

a second optical data transceiver operating simultaneously with said first optical data transceiver for continuously receiving said optical data transmitted from a second transmitter of said optical data transmitting device of said counterpart device, continuously converting said received data into said electrical data, and continuously supplying said converted data to a second input path, continuously converting said electrical data supplied from said second output path into said optical data, continuously transmitting said converted data to a second receiver of said optical data transmitting device of said counterpart device, and outputting second alarm data indicative of an abnormal existence or a nonexistence of the operation upon transmitting said data to said second receiver; and a selector for selecting said electrical data supplied to said first input path in response to the normal state of said first alarm data and selecting said electrical data supplied to said second input path in response to the normal state of said second alarm data.

2. An optical data transmitting method, comprising:

continuously dividing electrical data to be transmitted to an optical data transmitting device of a counterpart device into first and second output paths having the same electrical data contained thereon;

continuously converting the electrical data supplied to the first output path into optical data, continuously transmitting the converted data to a first receiver of the optical data transmitting device of the counterpart device, outputting first alarm data indicative of abnormal existence or a nonexistence of the operation upon transmitting the data to the first receiver, continuously receiving the optical data transmitted from a first transmitter of the optical data transmitting device of the counterpart device, continuously converting the received data into the electrical data, and continuously supplying the converted data to a first input path;

continuously receiving the optical data transmitted from a second transmitter of the optical data transmitting device of the counterpart device, continuously converting the received data into the electrical data, and continuously supplying the converted data to a second input path, continuously converting the electrical data supplied from the second output path into the optical data, continuously transmitting the converted data to a second receiver of the optical data transmitting device of the counterpart device, and outputting second alarm data indicative of an abnormal existence or a nonexistence of the operation upon transmitting the data to the second receiver; and selecting the electrical data supplied to the first input path in response to the normal state of the first alarm data and selecting the electrical data supplied to the second input path in response to the normal state of the second alarm data.

3. A pair of optical data transmitting devices for continuously transmitting optical data therebetween, comprising first and second optical data transmitting devices, each optical data transmitting device comprising:

- a demultiplexer for continuously dividing an electrical signal into first and second identical parts respectively output therefrom;
- first and second electrical/optical converters for continuously receiving said first and second outputs of said demultiplexer and for respectively outputting first and second identical optical signals;
- first and second optical/electrical converters for continuously receiving first and second optical signals from the other counterpart transmitting device and respectively converting said first and second optical signals into corresponding identical electrical signals;
- a multiplexer for receiving said electrical signals output from said first and second optical/electrical converters and combining them into a single electrical signal whose output corresponds to the output of either said first or second optical/electrical converters in dependence upon the operation of the transmitting device and the counterpart transmitting device; and
- said first and second data transmitting devices being permanently connected together by four optical cables, a first optical cable being connected between said first electrical/optical converter of said first transmitting device and said first electrical/optical converter of said second transmitting device and a second cable connected between said first electrical/optical converter of said second transmitting device and said first optical/electrical converter of said first transmitting device and a third optical electrical/optical converter of said first transmitting device and said second optical/electrical converter of said second transmitting device and a fourth optical cable connected between said second electrical/optical converter of said second transmitting device and said second optical/electrical converter of said first transmitting device.

* * * * *